United States Patent [19]

Schantz

[11] 4,133,407
[45] Jan. 9, 1979

[54] VEHICLE SPEED CONTROLLER

[76] Inventor: Spencer C. Schantz, 16608 W. Rogers Dr., New Berlin, Wis. 53151

[21] Appl. No.: 741,086

[22] Filed: Nov. 11, 1976

[51] Int. Cl.² ............................................. B60K 31/00
[52] U.S. Cl. .................................... 180/108; 123/102; 180/110; 73/519
[58] Field of Search ............................... 180/105–110; 123/102, 103 R; 137/625.65; 200/61.46, 276; 73/519; 192/3 TR, 3 T

[56] References Cited
U.S. PATENT DOCUMENTS

| | | | |
|---|---|---|---|
| 2,265,524 | 12/1941 | Fruth | 180/110 X |
| 3,070,185 | 12/1962 | Fales | 123/102 X |
| 3,087,340 | 4/1963 | McMurray et al. | 180/110 X |
| 3,092,090 | 6/1963 | Berninger | 123/103 R |
| 3,166,145 | 1/1965 | Wheeler | 180/108 |
| 3,216,522 | 11/1965 | Cassano | 123/102 X |
| 3,217,827 | 11/1965 | Pickles | 123/102 |
| 3,298,482 | 1/1967 | Mueller et al. | 180/109 X |
| 3,460,573 | 8/1969 | Beveridge et al. | 137/625.65 |
| 3,489,239 | 1/1970 | Thorner | 180/108 |
| 3,895,684 | 7/1975 | Takeshi et al. | 123/102 X |
| 3,921,670 | 11/1975 | Clippard | 137/625.65 |

Primary Examiner—Kenneth H. Betts
Attorney, Agent, or Firm—Wheeler, Morsell, House & Fuller

[57] ABSTRACT

A manually controlled set-speed-selector on the speedometer of a vehicle causes a pair of normally open electrical contacts to close when the speedometer indicator needle reaches the set point. This actuates a solenoid valve which applies intake manifold vacuum to an accelerator actuator to pull on a chain connected to the accelerator, thereby decelerating the vehicle. A vacuum relief valve enables the driver to over-ride the decelerating action for passing or emergency purposes. The flexibility of the chain enables the driver to slow down at any time by simply releasing foot pressure on the accelerator. One electrical contact is connected to the speedometer indicator needle by a torsion spring, which allows the contacts to chatter as they close due to vehicle vibration. The on time of the chattering contacts increases as the set speed is exceeded and reaches 100% at a predetermined overspeed value. The chattering contacts cause the vacuum to be applied in pulses to the accelerator actuator, thus producing a variable magnitude pull on the accelerator chain, the magnitude of the pull being directly proportional to the overspeed magnitude up to the point of 100% on time of the contacts. An optional mode of operation provides for "foot-off" operation which is initiated by manually engaging a latching relay-valve after the reaching of a desired speed has been signalled by a lifting of the accelerator pedal. This in turn causes engagement of a vacuum actuator to provide a steady force to the accelerator which opposes that of the accelerator actuator, thereby maintaining a preset speed until said speed is terminated by brake actuation or by a turning off of the device.

13 Claims, 5 Drawing Figures

VEHICLE SPEED CONTROLLER

BACKGROUND OF THE INVENTION

This invention relates to vehicle speed controllers. Automatic vehicle speed controllers as manufactured in the past have functioned to maintain a vehicle at a predetermined set speed without any assistance from the operator. Such vehicle speed controllers, which are commonly called "cruise controls", act to automatically decelerate the vehicle when it exceeds the set speed, and to automatically accelerate the vehicle when it falls below the set speed. When the cruise control is turned on, the driver removes his foot from the accelerator and allows the cruise control to make the accelerator adjustments that are necessary to maintain the vehicle at the set speed.

The above-described prior art cruise controller has several serious disadvantages. If the vehicle passes over an icy patch on the road while it is being operated by cruise control, the rear wheels may slip on the ice, but instead of decelerating to break the skid, the cruise controller holds the speed up to the set speed. To assume manual control of the vehicle, it is necessary for the operator to either apply the brakes or to switch the cruise controller off. Since application of the brakes might augment the skid, the operator must turn the cruise control off before the vehicle can be decelerated. However, turning the cruise control off is an unfamiliar motion that takes time. Furthermore, the driver may overlook this step or fumble in an emergency, whereas control of foot pressure on an accelerator is an instinctive reaction when the vehicle is under manual control. With the above in mind, it is highly desirable to provide a vehicle speed controller so constructed to offer both the maintained speed operating mode and one in which the operator's foot remains on the accelerator while the controller is operating so that the vehicle can be decelerated at any time by merely releasing the foot pressure on the accelerator.

Another drawback of prior art cruise controllers is that they are relatively expensive.

SUMMARY OF THE INVENTION

In accordance with this invention, the foregoing drawbacks are overcome by connecting the accelerator actuator to the accelerator with an elongated flexible member such as a chain or a cable and by having novel means for applying a decelerating pull on the accelerator without interfering with normal foot controlled deceleration when required, and there being an optional mode of operation which permits "foot-off" operation when desired.

A more specific object of the invention is to provide a device in which the decelerating pull on the accelerator is produced by applying the intake manifold vacuum to a vacuum actuator for the accelerator, the latter action being responsive to closing of a pair of electrical contacts on the speedometer.

A further object of the invention is to provide an improved device wherein one of the electrical contacts is mounted on the outer end of a torsion spring whose inner end is attached to the speedometer indicator, and wherein the other electrical contact is mounted on the set speed selector. With this arrangement, the contacts chatter when they close, the on time of the contacts increasing as the set speed is exceeded and reaching 100% at a predetermined overspeed value. The contact chattering causes the vacuum to be desirably applied in pulses, thus producing a variable magnitude pull on the accelerator chain, the magnitude of the pull being directly proportional to the overspeed magnitude up to the point of 100% contact on time.

A further object of the invention is to provide an economical speed control with an optional operating mode that permits speed to be maintained while the driver's foot is removed from the accelerator. Improved safety is achieved by novel circuitry that prevents engagement of the speed maintaining feature unless the preset desired speed has been achieved and has been signaled by back pressure on the accelerator and unless an activating button has been simultaneously pushed.

Other objects and advantages of the invention will be apparent from the following description.

DESCRIPTION OF THE PREFERRED EMBODIMENT

Figure 1:
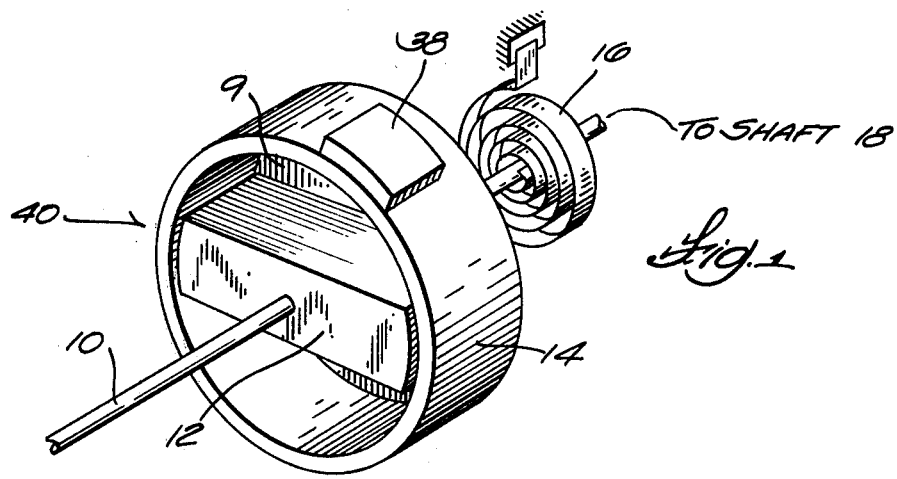
FIG. 1 is a diagrammatic perspective view showing some of the moving parts of one type of speedometer.

FIG. 1 shows the moving parts of a typical eddy current speedometer in which shaft 10 is rotated by a flexible linkage (not shown) at a speed which is directly proportional to the speed of the vehicle. Shaft 10 in turn rotates a permanent magnet 12 which is rotatably mounted within an eddy current cup 14, the latter being made of a non-magnetic electrically conductive material and being driven by the induced eddy current against the force of a torsion spring 16. Eddy current cup 14 is coupled by conventional means to a shaft 18 (FIG. 2) which has an indicator needle 20 rigidly attached thereto. This connection may, in the preferred embodiment, be accomplished by having the shaft 18 connected to the center of the bottom 9 of cup 14. Indicator needle 20 is movable over a semicircular scale 22 on the conventional dial to indicate the speed of the vehicle.

A set-speed-selector-indicator needle 26 is rotatably mounted coaxially of the speedometer shaft 18 but is not connected thereto. A manual speed selector knob 28 is connected by suitable gears (not shown) to set-speed-selector-indicator needle 26 and serves to rotate set-speed-indicator 26 over scale 22 to the desired set speed.

A first electrical contact 30 is rigidly attached to set-speed-selector-indicator 26 and rotates therewith. A second electrical contact 32 is rigidly attached to the outer end of a torsion spring 34 whose inner end is rigidly attached to shaft 18 and rotates therewith. Contacts 30 and 32 are positioned to make contact when speedometer indicator 20 reaches the speed value at which set-speed-indicator 26 has been set.

Torsion spring 34 is selected to be weak enough to permit contacts 30 and 32 to chatter when they first make contact, the chattering being due to vibration of the speedometer induced by vibration of the vehicle. As the speedometer indicator needle 20 moves past the set speed, the contact pressure produced by torsion spring 34 increases, causing the on time percentage of contacts 30-32 to increase until it reaches 100% at a predetermined overspeed value. The above-noted contact chatter is desirable for reasons that are explained hereinafter and can be enhanced by adding a small mass such as a drop of solder 36 (FIG. 2) to contact 32. The contact chatter can also be enhanced by adding a small permanent magnet 38 (FIG. 1) to eddy current cup 14, the magnet 38 causing a small periodic pulse in the rotational position of speedometer needle 20 each time magnet 12 rotates past magnet 38 due to alternate magnetic attraction and repulsion. A piece of magnetic material may alternatively be used at 38, but this will provide attraction only and not repulsion.

Figure 2:
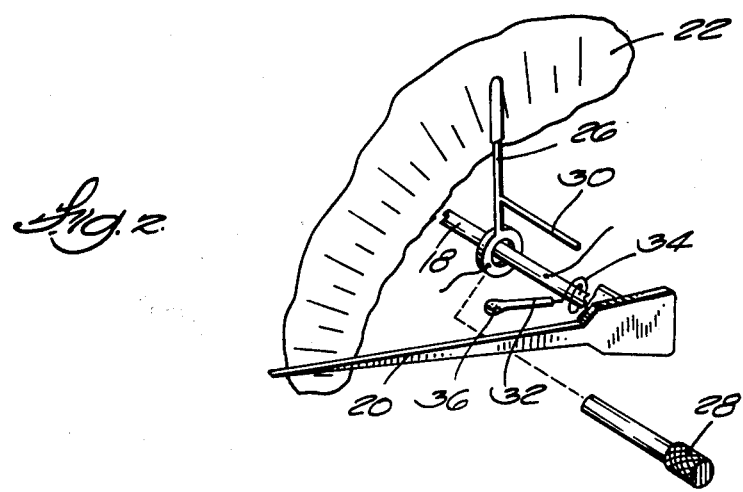
FIG. 2 is a diagrammatic perspective view illustrating other moving parts of the speedometer, and showing a set-speed-selector and a pair of normally open electrical contacts which close when the indicated speed reaches the set speed.
Figure 3:
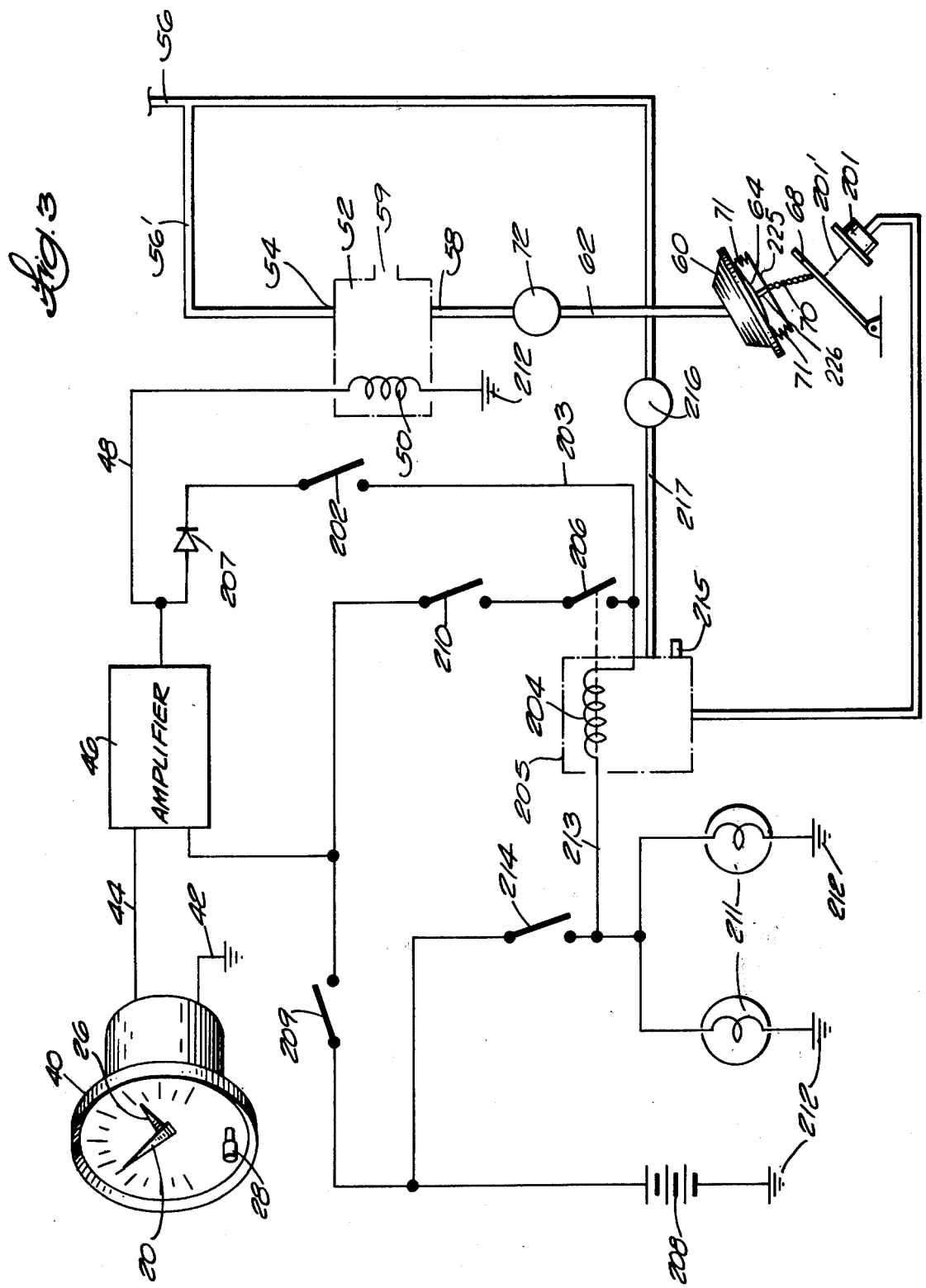
FIG. 3 is a schematic electrical and vacuum circuit diagram of the preferred embodiment of the invention.
Figure 4:
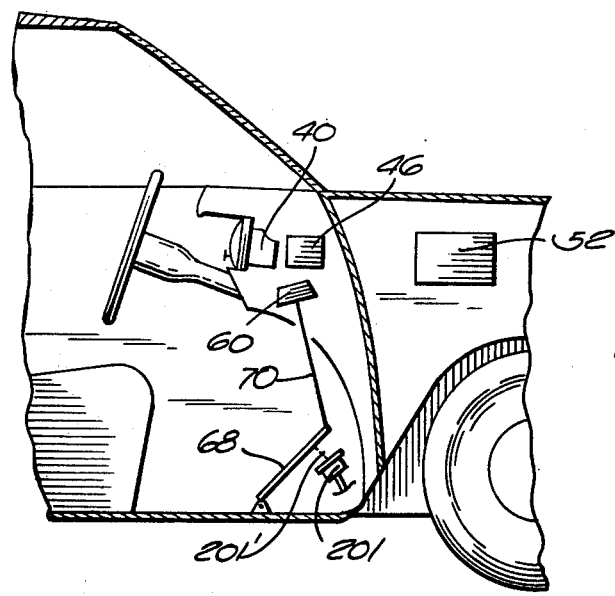
FIG. 4 is a diagrammatic side view of an automobile showing the location of the speed controller components therein.

FIG. 3 is a schematic diagram of a vehicle speed controller utilizing the speedometer 40 with speed indicator needle 20, set-speed-indicator needle 26, set-speed-selector knob 28, with contacts 30 and 32 normally open as described above. Contacts 30 and 32 are not visible in FIG. 3, but it will be understood that they are connected to set-speed-indicator needle 26 and speedometer needle 20 as shown in FIG. 2.

In the first or pacer operating mode, one of the contacts 30-32 is coupled to a grounded conductor 42 (FIG. 3), and the other contact is coupled via conductor 44 to an amplifier 46 whose output is coupled via conductor 48 to the coil 50 of an electrically operated valve 52. Said valve 52 has an inlet port 54 which is coupled to the intake manifold vacuum via conduit 56 and has an outlet port 58 which is coupled to an accelerator actuator 60 via conduit 62, there being a vacuum release valve 72 in the latter conduit. Outlet port 58 is normally in communication with the port 59 so as to vent to the atmosphere, but is switched into communication with inlet port 54 when coil 50 is energized.

When coil 50 is energized by the output of amplifier 46, in response to the closing of contacts 30-32, inlet port 54 is internally coupled to outlet port 58, thereby applying a vacuum to accelerator actuator 60, the latter containing a closed chamber, one wall of which is formed by a diaphragm 64. Diaphragm 64 is connected to the pedal 68 of accelerator mechanism through an elongated flexible linkage 70 which can be a bead chain, flexible cable, or the like. Diaphragm 64 is adapted to pull up on linkage 70 in response to vacuum applied to accelerator actuator 60 to decelerate the vehicle. As the speed of the vehicle falls below the set speed, contacts 30-32 open and terminate the pull on linkage 70.

Due to the chattering of contacts 30-32 when they initially close, the vacuum is applied in pulses to accelerator actuator 60, the duration of each pulse being equal to the on time of contacts 30-32 for each pulse. The venting to the atmosphere also occurs in pulses in this case, the duration of each vent pulse being equal to the off time of contacts 30-32. Electrically operated valve 52 has a response time which is short enough to permit it to chatter in synchronism with contacts 30-32. When contacts 30-32 first close, the on time is relatively short and thus introduces relatively short pulses of vacuum into accelerator actuator 60, and relatively long pulses of venting to the atmosphere, thereby producing a relatively light pull on linkage 70. As the indicated speed passes the set speed, the length of the contact on time increases, thereby increasing the pull on linkage 70 until the contact on time reaches 100% at a predetermined overspeed. The magnitude of the pull on linkage 70 is directly proportional to the overspeed up to the point of 100% contact on time. This increase in the magnitude of pull on linkage 70 with an increase of overspeed is desirable because it enables the same system to work successfully for individuals who have a light touch on the accelerator as well as for those who have a heavy touch.

In order to enable the operator to accelerate for passing or for emergencies, a vacuum relief valve 72 is connected in parallel with conduit 62 so that sufficient foot pressure of accelerator pedal 68 will over-ride the pull on linkage 70 and enable the operator to accelerate up to any desired speed regardless of the setting of set-speed-selector-indicator 26. Vacuum relief valve 72 can also be incorporated into valve 52 as described hereinafter.

In the operation of this embodiment, the operator adjusts the foot pressure on accelerator pedal to a level which will hold the speed slightly over the set speed in the range in which the contacts 30-32 chatter. If the vehicle tends to accelerate, the speed controller will increase the decelerating pull on linkage 70 and thus counteract the acceleration. If the vehicle tends to decelerate, the controller counteracts this tendency by decreasing the vacuum level in the actuator and allowing the pedal to drop. If at any time the operator wishes to decelerate, e.g. in the case where the rear wheels start to skid on the ice, this can be done quite simply by the normal method of releasing the foot pressure on the accelerator.

"Foot-off" cruising can be achieved by use of an accelerator-force-maintaining actuator 201 connected by linkage 201' with the accelerator pedal working in opposition to the pull on linkage 70 with a force less than the pull allowed by vacuum relief valve 72.

Cruise engage switch 202 is supplied with power by amplifier 46 when the contacts 30-32 are closed, indicating that the predetermined speed has been reached. This arrangement prevents inadvertent acceleration as a result of accidental contact with switch 202, which could create a dangerous situation. Manual closing of switch 202, when pressure from accelerator pedal 68 is felt on the driver's foot, allows current to flow through wire 203 to coil 204 of valve 205. Coil 204 also energizes contacts 206 which maintain the current to coil 204, even though switch 202 is released, and amplifier 46 turns off in response to opening of contacts 30-32. Diode 207 prevents reverse flow of current to coil 50. Standard ignition switch 209 controls the connection of the total system to battery 208, and cruise on-off switch 210 controls the cruise function.

The opposite side of coil 204 is connected by wire 213 through brake light bulbs 211 to ground 212. The resistance of the unilluminated bulbs 211 is very low in relation to that of coil 204 so that the voltage potential of wire 213 is essentially the same as ground 212. When brake switch 214 (the switch normally in a car) is closed, illuminating brake lights 211 in the conventional manner, the voltage in wire 213 becomes the same as that in wire 203, resulting in loss of voltage across coil 204 and causing valve 205 to vent to the atmosphere through port 215. This causes contacts 206 to open. This results in discontinuance of the force applied by cruise actuator 201 to accelerator 68. Because of wide variations in engine vacuum, a vacuum regulator 216 is provided between hose 217 and vacuum source connection 56.

Figure 5:
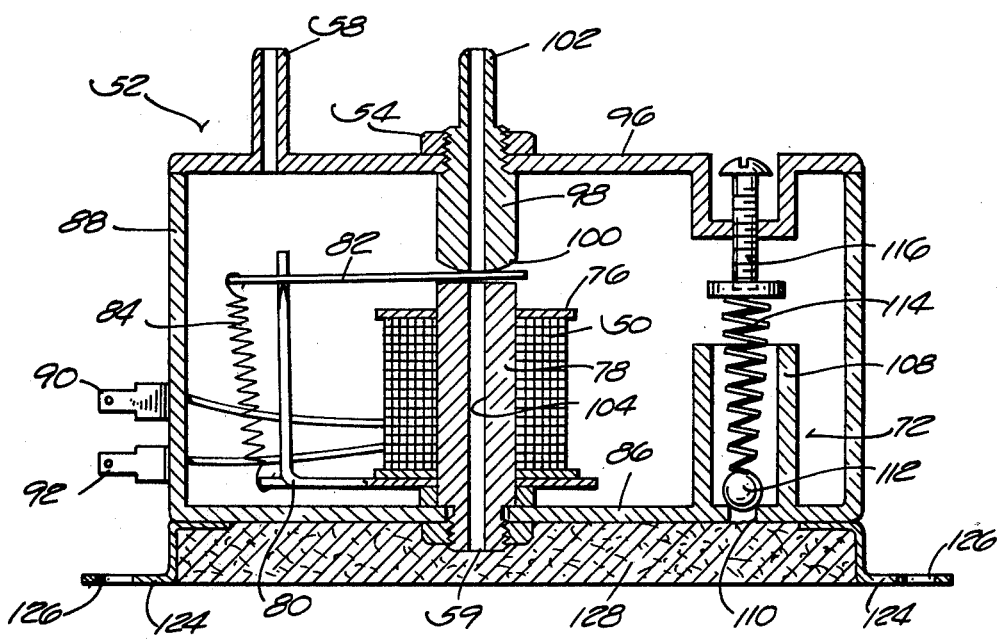
FIG. 5 is a longitudinal sectional view of a solenoid vacuum valve and vacuum relief valve.

FIG. 5 shows the preferred form of valve 52. Coil 50 is wound on a conventional bobbin 76 having a cylindrical ferromagnetic core 78 which is attached to the bottom of an L-shaped ferromagnetic frame 80. A ferromagnetic armature 82 is pivotally connected to the top of frame 80 in any suitable way and is normally spring biased to its upward position. This may be accomplished by a spring 84 which is connected between the end of armature 82 and the bottom of frame 80. The magnetic frame 80 is rigidly attached to the bottom 86 of an airtight housing 88 which forms a closed chamber. Electrical terminals 90 and 92 are mounted on the side of housing 88 and are coupled to the ends of coil 50.

A vacuum inlet port 54 is attached to the top 96 of housing 88 above armature 82 and has a downwardly extending conduit portion 98 which terminates close enough to the normal position of armature 82 to be normally closed thereby. The inner end 100 of conduit portion 98 is preferably semi-spherical in shape to provide an airtight closure in the normal position of armature 82. Inlet port 54 has an outwardly extending portion 102 shaped to receive a conduit for connection to the intake manifold of the vehicle engine. Inlet port 54 is connected to housing 88 by screw threads to permit adjustment of the vacuum flow through valve 52.

Solenoid core 78 has a central opening 104 which terminates in an atmospheric vent 59 which is normally open to maintain atmospheric pressure within airtight housing 88 when coil 50 is not energized. When coil 50 is energized, armature 82 is drawn downward onto the top of core 78 by the magnetic field of coil 50, thus opening inlet port 54 and closing atmospheric vent 59. This admits the suction from the vehicle's intake manifold and reduces the pressure within housing 88. This reduction in pressure is communicated to accelerator actuator 60 (FIG. 3) through a conventional outlet port 58 and conduit 62 (FIG. 3) and produces a corresponding pull on accelerator pedal 68 via linkage 70.

When coil 50 is subsequently de-energized, armature 82 returns to its upward position due to the force of spring 84, thereby opening atmospheric vent 59 and closing vacuum inlet port 54. Air then enters housing 88 through atmospheric vent 59 and increases the pressure therein. When contacts 30-32 are chattering, as described previously, air will alternately enter housing 88 and be drawn therefrom, the pressure within housing 88 then being dependent on the percentage of on time for the coil, the level of intake manifold pressure, the intake port cross-sectional area, the air vent cross-sectional area, and the volume of housing 88. For any given set of structural parameters, the pressure within housing 88 will be inversely proportional to the on time percentage of coil 50, which in turn is directly proportional to the percentage of on time of contacts 30-32. Since the pull on linkage 70 is inversely proportional to the pressure in accelerator actuator 60, the pull on linkage 70 will then be directly proportional of the on time percentage of contacts 30-32 up to the 100% on time level, at which time the maximum pull will be exerted on linkage 70.

In this particular embodiment, the vacuum relief valve 72 is mounted on the bottom 86 of housing 88. Vacuum relief valve 72 includes a hollow cylindrical body 108 which is attached to housing bottom 86. An opening 110 is formed in bottom 86 directly under cylinder 108. A ball 112 within cylinder 108 is urged by a spring 114 against opening 110 to normally close opening 110. An adjustment screw 116 extends through housing top 96 and serves to adjust the normal tension on spring 114.

When the vacuum within housing 88 exceeds a predetermined level, determined by the strength of spring 114 and the position of adjustment screw 116, atmospheric pressure pushes ball 112 off opening 110 against the force of spring 114. This allows air to enter housing 88 through opening 110 as long as ball 112 remains off opening 110. Vacuum relief valve 72 vents to the atmosphere in response to the high level of vacuum created when accelerator pedal 68 is pressed down firmly or when contacts 30-32 are closed 100% of the time. This enables the operator to over-ride the decelerating pull on chain 70 to accelerate past the set speed for passing or for emergencies.

For convenience in mounting, ears 124 with holes 126 are attached to the bottom 86 of housing 88. Filter material 128 is inserted around the bottom of openings 59 and 110 to filter the air drawn into housing 88 through atmospheric vent 59 and vacuum relief vent 110.

To shorten the response time for the above-described speed controller, a suitable vacuum bias can be applied to valve 52 via atmospheric vent 59 to keep linkage 70 taut when the vehicle's indicated speed is below the set speed so that the decelerating pull thereon will take effect as soon as the pressure drops in accelerator actuator 60. Alternately, the same effect can be obtained by applying a suitable spring bias to diaphragm 64 of accelerator actuator 60 such as provided by springs 71 in FIG. 3 springs 71 each have one of their corresponding ends fastened to actuator housing 60 adjacent the edge of diaphragm 64 and the other of their corresponding ends fastened to a disk 225. A stem 226 has one of its ends fastened to diaphragm 64 and its other end fastened to disk 225. One end of chain 70 is effectively fastened to both disk 225 and stem 226. Hence, When a vacuum in actuator housing 60 tends to pull diaphragm 64 into the housing, springs 71 compress a little and chain 70 is in tension. When vacuum on diaphragm 64 is relieved, the springs expand a little but not so much that slack will develop in chain 70 so there is always some tension in the chain and back-biasing force on foot-pedal 68. Thus, the chain is always taut and no slack needs to be taken out of it when foot-pedal 68 is depressed.

The above-described bias also enables the accelerator actuator to function as a dash-pot so that when the accelerator pedal is depressed there is a resistant force while the pedal is moving.

Various changes and modifications may be made without departing from the spirit of the invention, and all of such changes are contemplated as may come within the scope of the claims.

What I claim is:

1. A speed controller for use in a vehicle including foot-operated mechanism which is movable in a first direction to increase vehicle speed and movable in second direction opposite to the first direction to decrease vehicle speed, said controller comprising:
   a first actuator including a vacuum chamber and diaphragm means mounted in the chamber,
   means for coupling said diaphragm to said mechanism,
   valve means comprising a housing having a first port for communicating with a source for producing a vacuum that corresponds with vehicle speed, a second port for communicating with said actuator chamber and a third port for communicating with the atmosphere, a valve member operable to control pressure communication between said second and first port and said second and third port, and electrically energizable means for operating said valve member, means including a first electric contact settable in a stationary position corresponding with the desired speed of the vehicle, rotatable means that rotate through an angle corresponding substantially with the actual speed of said vehicle, a second electrical contact and a torsion spring connected to said rotatable means and supporting said second contact resiliently on said rotatable means for said second contact to make contact for relatively short intervals and break contact intermittently with said first contact for relatively longer intervals in response to vibrations produced by said vehicle after said rotatable means has rotated through a sufficient angle to enable initial contact between said second and first contacts and for the torsion of said spring to increase in correspondence with said rotatable means rotating through an increasing angle as said vehicle speed increases to thereby cause said contacts to make for relatively longer intervals and break for relatively shorter intervals, means for coupling said first and second contacts in circuit with said electrically energizable means for operating said valve member to communicate said vacuum pressure from said port with said second port and alternately with said third port in correspondence with the durations of the making and breaking of said contacts to thereby control the force applied by said diaphragm means that tends to move said foot-operated mechanism in said second direction.

2. The speed controller as in claim 1 including a relief valve for reducing the vacuum force on said diaphragm in response to said force tending to increase when said foot-operated mechanism is forced to move rapidly in said first direction for increasing vehicle speed.

3. The speed controller as in claim 1 including an amplifier having input and output means, said first and second contacts being connected in circuit with said input means and said electrically energizable means being connected in circuit with said output means.

4. The speed controller as in claim 1 wherein said means for coupling said diaphragm to said mechanism comprises a flexible element and including means for applying sufficient biasing force to said diaphragm in a direction to hold said element taut when said vehicle speed is too low for said contacts to close and cause said vacuum to be applied to said diaphragm.

5. The speed controller as in claim 4 wherein said means for applying said biasing force comprises spring means coupled between said actuator and said flexible element.

6. The speed controller as in claim 1 wherein said valve means comprises an element in said housing having an axial passageway constituting said first port, which is coupled with said vacuum source, a core having an axial passageway coaxial of and adjacent and in spaced relation to the aforesaid passageway and constituting said third port which is coupled with the atmosphere, said electrically energizable means comprising a coil magnetically coupled with said core, said valve member being movable in the space between said passageways under the magnetic influence of said coil so that when said valve member increasingly restricts flow through one passageway it allows less restricted flow through the other.

7. The controller in claim 6 including a vacuum relief valve in said housing comprising a valve seat having an opening leading to the atmosphere, a valve element and a spring for biasing said valve element into engagement with said seat, the force of said spring being overcome to allow said valve element to unseat and permit atmospheric air to enter said housing and diminish said vacuum when said vacuum is suddenly increased by said foot-operated mechanism being moved in the direction which opposes the force on said diaphragm and increases the vehicle speed.

8. The speed controller as in claim 1 including means for maintaining constant vehicle speed although the foot of the vehicle operator has been removed from said foot-operated mechanism said means including:

a second actuator responsive to the influence of vacuum by producing a force, means for coupling said second actuator to said foot-operated mechanism in such manner that the force of the second actuator can oppose the force of said first actuator, second valve means comprising a housing having a vacuum input first port for communicating with said source of vacuum, a second port for communicating with said second actuator, a third port for communicating with the atmosphere and electroresponsive valve operating means which when energized couples said second port of said second valve means and said second actuator to said vacuum input first port of said second valve means and when deenergized couples said second port of said second valve means to its third port to enable atmospheric air to enter said second actuator, a circuit including a first switch that is operable to energize said electroresponsive valve operating means provided said vehicle has attained a speed that will cause said first and second contacts to make contact, said circuit including a brake operation indicating light in series with said electroresponsive means, a holding second switch in a second circuit for being connected between an electric power source and said electroresponsive means, said second switch becoming conductive in response to said electroresponsive means being energized through said first switch to thereby maintain energization of said electroresponsive means so said second actuator will develop a force which balances the force of said first actuator to maintain constant vehicle speed, a third circuit including a brake operation responsive switch for connecting said electric power source jointly to said brake indicating light and said electroresponsive valve operating means, closure of said brake operation responsive switch means resulting in a drop in the potential on said electroresponsive means and deenergization thereof for said second valve means to cause said second actuator to relieve its force and permit vehicle speed to decrease.

9. The speed controller as in claim 8 including vacuum pressure regulator means interposed between said vacuum input first valve port of said second valve means and said vacuum source for maintaining a constant vacuum level in said second actuator when its valve means has communicated its said first and second ports.

10. A speed controller for use in a vehicle including foot-operated mechanism which is movable in a first direction to increase vehicle speed and in a second direction opposite of the first to decrease vehicle speed, said controller comprising:

a speedometer having a movable element that moves in correspondence with vehicle speed, and a settable element that is settable to a stationary position corresponding with a desired set speed, a first electric contact and torsion spring means supporting said contact from one of said elements and a second electric contact on the other of said elements, said contacts being separated completely from each other when said vehicle is substantially below set speed and being subject to begin making and breaking contact with each other due to vibrations caused by said vehicle when said vehicle is approaching set speed, the time during which said contacts are made increasing with increasing vehicle speed, a first actuator including a vacuum chamber and a diaphragm mounted in said chamber, flexible linkage for coupling said diaphragm to said foot-operated mechanism, first valve means comprising a housing having a first port for being coupled with a source for producing a vacuum at a level that corresponds with vehicle speed, a second port for being coupled with said first actuator chamber and a third port for being coupled with the atmosphere, a valve member operable to couple said vacuum source with said first actuator and alternatively to couple said first actuator to the atmosphere, and an electromagnet coil for operating said valve member.

first circuit means for energizing and deenergizing said coil in correspondence with the times during which said contacts are made and broken, respectively, to thereby control the rate at which said valve member is operated and to determine the vacuum level in said first actuator and the force applied by said actuator that tends to move said mechanism in said second direction, a second actuator responsive to the influence of vacuum by producing a force, and means for coupling said second actuator to said foot-operated mechanism in such manner that the force of the second actuator can oppose the force of the first actuator, second valve means for controlling said second actuator and comprising a housing having a vacuum input first port for being coupled to said vacuum source and regulator means for maintaining the vacuum level at said first port of said second valve means constant, a second port in said second valve means for being coupled with said second actuator and a second electromagnet coil having input and output terminals, said second coil when energized coupling said vacuum input first port of said second valve means to its said second port and said second actuator and when deenergized coupling said second actuator to the atmosphere, a second circuit including a first switch that is operable to energize said second electromagnet coil provided said vehicle has attained a speed that will cause said first and second contacts to make contact, said circuit including a brake operation indicating light connected to said output terminal of said second electromagnet coil, a third circuit for being connected to a voltage source and to said input terminal of said second coil, said circuit including a holding switch which closes to maintain said potential on said second coil in response to energization of said second coil, a fourth circuit connected to said voltage source and to said second terminal and said brake indicating light, said fourth circuit including a third switch that closes in response to operation of the vehicle brakes to fully energize said brake indicating light and substantially reduce the voltage drop across said second coil and to deenergize it and cause said second actuator to be coupled with the atmosphere to thereby relieve said opposing force on said foot-operated mechanism.

11. The speed controller as in claim 10 including a vacuum relief valve for reducing the vacuum level on said second actuator in response to said level tending to increase when said foot-operated mechanism is forced to move rapidly in said first direction for increasing the vehicle speed.

12. The speed controller as in claim 10 including means for applying sufficient biasing force to said diaphragm of said first actuator in a direction to hold said flexible linkage taut when said vehicle speed is too low for said vibratable contacts to close and cause said vacuum to be applied to said diaphragm.

13. The speed controller as in claim 10 wherein said speedometer has a rotatable eddy current cup coupled with said element that supports said spring means for said one of said contacts, a permanent magnet rotatable in said cup at a rate corresponding with vehicle speed, and a magnetic mass attached to said cup to induce vibration in said one contact to thereby enhance chatter of said contacts when the set speed of the vehicle is being approached.

* * * * *